United States Patent [19]

Colon

[11] Patent Number: 5,749,587
[45] Date of Patent: May 12, 1998

[54] HAND TRUCK FOR EASY REMOVAL OF CARRIED OBJECTS

[76] Inventor: Jose Colon, 763 Banks Rd., Margate, Fla. 33063

[21] Appl. No.: 603,361

[22] Filed: Feb. 20, 1996

[51] Int. Cl.$^6$ ............................................. B62B 1/12
[52] U.S. Cl. ............................. 280/47.27; 280/47.29; 414/490
[58] Field of Search .................. 280/47.151, 47.17, 280/47.24, 47.27, 47.29; 414/444, 490, 445, 446, 447

[56] References Cited

U.S. PATENT DOCUMENTS

| | | | |
|---|---|---|---|
| 2,452,258 | 10/1948 | Nielsen | 414/490 |
| 2,476,202 | 7/1949 | Lozon | 414/490 |
| 2,649,219 | 8/1953 | Nielsen | 414/490 |
| 2,838,193 | 6/1958 | Statton | 414/490 |
| 5,290,051 | 3/1994 | Olson | 280/47.27 |
| 5,443,349 | 8/1995 | Mehta | 414/490 |
| 5,599,156 | 2/1997 | Layne et al. | 280/47.29 |
| 5,624,224 | 4/1997 | Brandenburg | 280/47.27 |

FOREIGN PATENT DOCUMENTS

| | | | |
|---|---|---|---|
| 496406 | 9/1953 | Canada | 280/47.29 |
| 1301239 | 9/1961 | France | 280/47.29 |
| 2742101 | 3/1979 | Germany | 414/490 |

*Primary Examiner*—Brian L. Johnson
*Assistant Examiner*—Min Yu

[57] ABSTRACT

A hand truck for easy removal of carried objects. A hand truck has a frame with a front face and a rear face and an upper end for handling and lower ends positionable near the ground. Also provided are a pair of supports having upper ends secured to the rear face of the frame adjacent to upper regions thereof and having lower ends secured to the rear face of the frame adjacent to lower regions thereof. Support brackets are located on each side of the frame coupling the lower portions of the frame to the central regions of the supports. A pair of wheels are rotatably supported about horizontal axes secured to the supports near lower regions thereof. A retainer has an elongated generally horizontal portion and a generally vertical portion secured to the front face of the frame adjacent to the lower ends thereof.

1 Claim, 3 Drawing Sheets

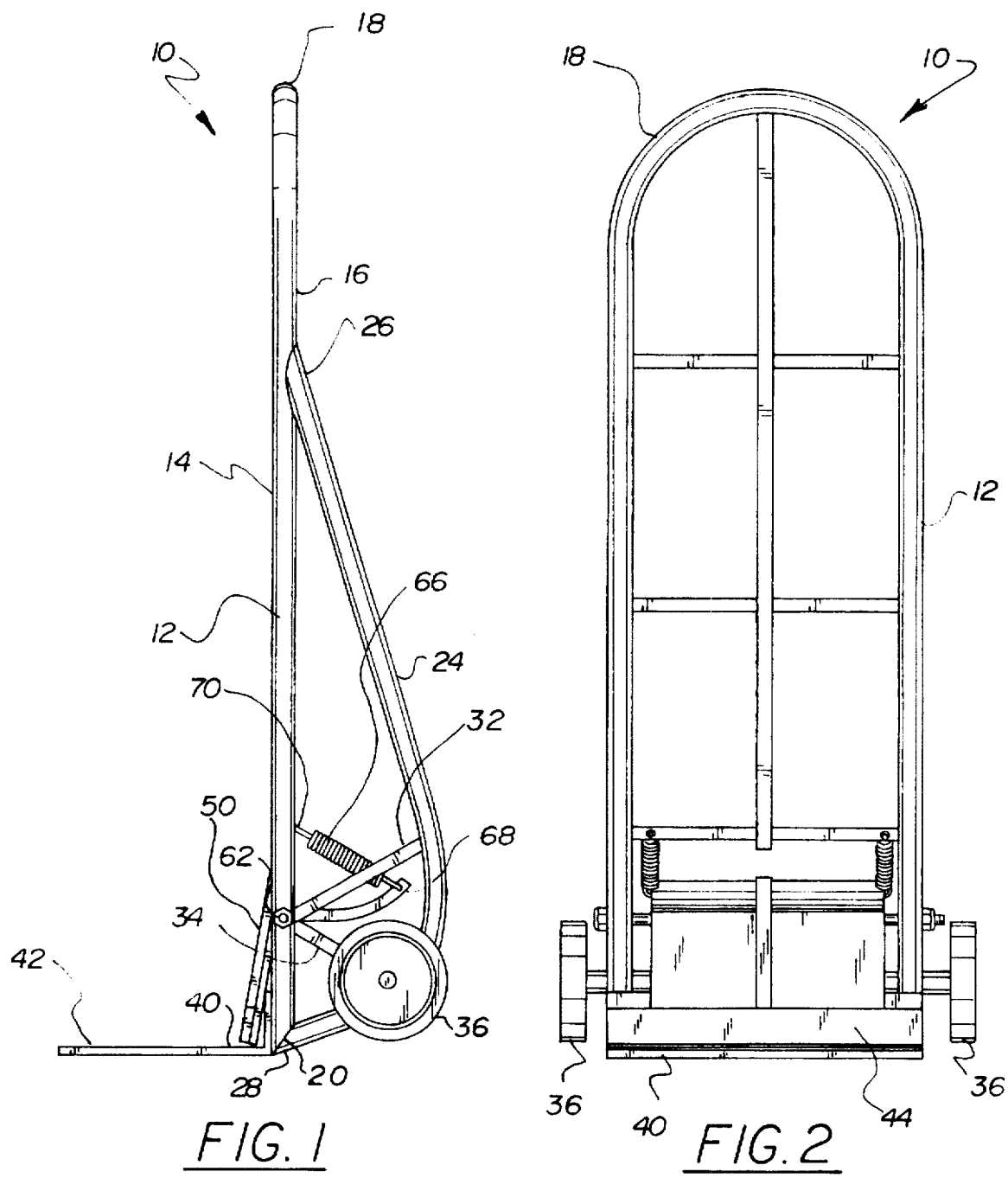

5,749,587

HAND TRUCK FOR EASY REMOVAL OF CARRIED OBJECTS

BACKGROUND OF THE INVENTION

1. Field of the Invention

The present invention relates to a new and improved hand truck for easy removal of carried objects and, more particularly, pertains to sliding off carried objects from hand trucks through a foot-operated pivot member.

2. Description of the Prior Art

The use of hand trucks of various designs and configurations is known in the prior art. More specifically, hand trucks of various designs and configurations heretofore devised and utilized for the purpose of facilitating the transportation and shifting of boxes and other objects through various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for sliding off carried objects from hand trucks through a foot-operated pivot member. By way of example, U.S. Pat. No. 4,114,916 to Oyama discloses a hand truck with a temporary load-supporting section at one end slidably supported on the main frame.

U.S. Pat. No. 4,226,434 to Hill et al. discloses a hand truck for lifting and moving heavy objects on a floor surface.

U.S. Pat. No. 4,752,173 to Fleming discloses a hand truck apparatus for lifting as well as transporting loads, such as solid core doors, and method of installing a door.

U.S. Pat. No. 4,893,824 to Turek et al. discloses a hand truck for filing cabinets having an L-shaped end bracket affixable to an item carried on the hand truck.

U.S. Pat. No. 5,190,304 to Prentiss et al. discloses a hand truck having a supplemental support stand for allowing the device to be rested in an inclined orientation.

Lastly, U.S. Pat. No. 5,251,922 to Mann discloses a hand truck having an automatically adjustable toe plate.

In this respect, the hand truck for easy removal of carried objects according to the present invention substantially departs from the conventional concepts and designs of the prior art, and in doing so provides an apparatus primarily developed for the purpose of sliding off carried objects from hand trucks through a foot-operated pivot member.

Therefore, it can be appreciated that there exists a continuing need for a new and improved hand truck for easy removal of carried objects which can be used for sliding off carried objects from hand trucks through a foot-operated pivot member. In this regard, the present invention substantially fulfills this need.

SUMMARY OF THE INVENTION

In view of the foregoing disadvantages inherent in the known types of hand trucks of various designs and configurations now present in the prior art, the present invention provides an improved hand truck for easy removal of carried objects. As such, the general purpose of the present invention, which will be described subsequently in greater detail, is to provide a new and improved hand truck for easy removal of carried objects and methods which have all the advantages of the prior art and none of the disadvantages.

To attain this, the present invention essentially comprises a new and improved hand truck for easy removal of carried objects comprising, in combination, a hand truck having an inverted generally U-shaped frame with a front face and a rear face and a curved upper end for handling and free lower ends positionable near the ground, a pair of curved supports having upper ends secured to the rear face of the frame adjacent to upper regions thereof and having lower ends secured to the rear face of the frame adjacent to lower regions thereof, a plurality of support brackets on each side of the frame coupling the lower portions of the frame to the central regions of the supports, a pair of wheels rotatably supported about horizontal axes secured to the supports near lower regions thereof; an L-shaped retainer having an elongated generally horizontal portion and a short generally vertical portion secured to the front face of the frame adjacent to the lower ends thereof; a pusher member including a small horizontally extending plate positionable in a first rest orientation adjacent to the vertical plate of the retainer with an associated small vertically extending plate extending upwardly from the small plate with an enlarged rectangular backing plate coupling the horizontal and vertical plates and a rearwardly extending curved lever extending rearwardly between the supports with a pivot pin coupling the lever to the frame adjacent to a lower region thereof; and a plurality of coil springs with lower ends secured to the rearward portion of the lever and upper ends coupled to the frame adjacent a central extent thereof.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hand truck for easy removal of carried objects which has all the advantages of the prior art hand trucks of various designs and configurations and none of the disadvantages.

It is another object of the present invention to provide a new and improved hand truck for easy removal of carried objects which may be easily and efficiently manufactured and marketed.

It is a further object of the present invention to provide a new and improved hand truck for easy removal of carried objects which is of a durable and reliable construction.

An even further object of the present invention is to provide a new and improved hand truck for easy removal of carried objects which is susceptible of a low cost of manufacture with regard to both materials and labor, and which accordingly is then susceptible of low prices of sale to the consuming public, thereby making such hand trucks of various designs and configurations economically available to the buying public.

Still yet another object of the present invention is to provide a new and improved hand truck for easy removal of carried objects which provides in the apparatuses and methods of the prior art some of the advantages thereof, while simultaneously overcoming some of the disadvantages normally associated therewith.

Even still another object of the present invention is to sliding off carried objects from hand trucks through a foot-operated pivot member.

Lastly, it is an object of the present invention to provide a hand truck for easy removal of carried objects. A hand truck has a frame with a front face and a rear face and an upper end for handling and lower ends positionable near the ground. Also provided are a pair of supports having upper ends secured to the rear face of the frame adjacent to upper regions thereof and having lower ends secured to the rear face of the frame adjacent to lower regions thereof. Support brackets are located on each side of the frame coupling the lower portions of the frame to the central regions of the supports. A pair of wheels are rotatably supported about horizontal axes secured to the supports near lower regions thereof. A retainer has an elongated generally horizontal portion and a generally vertical portion secured to the front face of the frame adjacent to the lower ends thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the preferred embodiment of the new and improved hand truck for easy removal of carried objects constructed in accordance with the principles of the present invention.

FIG. 2 is a front elevational view of the device shown in FIG. 1.

The same reference numerals refer to the same parts throughout the various Figures.

DESCRIPTION OF THE PREFERRED EMBODIMENT

Figure 3:
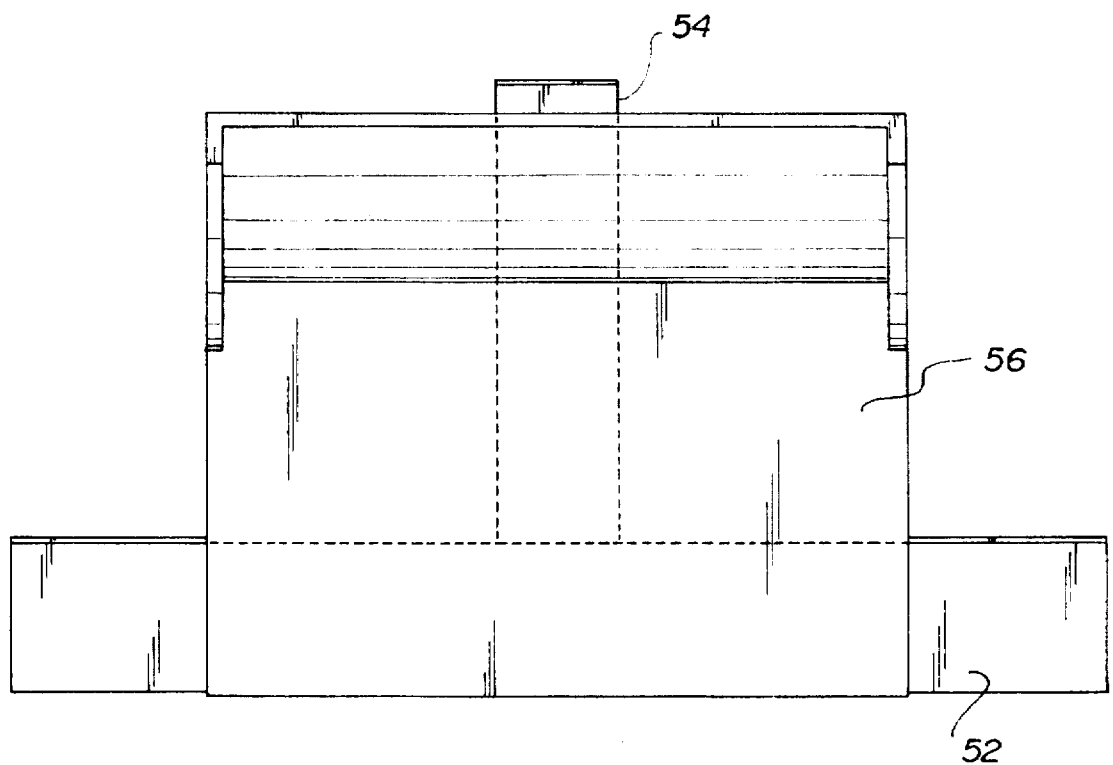
FIG. 3 is a top plan view of the device shown in the prior Figures.
Figure 4:
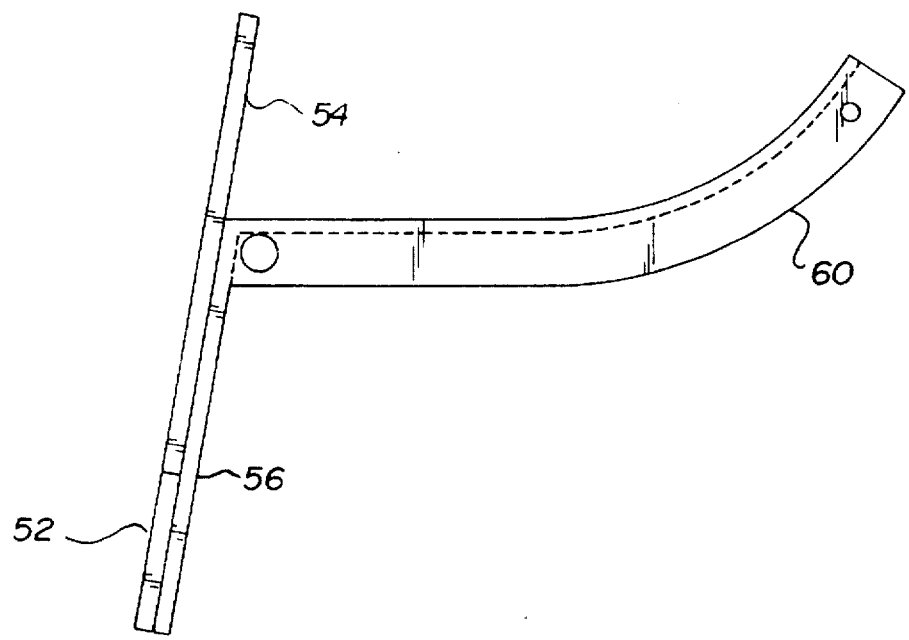
FIG. 4 is a side elevational view of the push mechanism utilized with the hand truck of the prior Figures.

With reference now to the drawings, and in particular to FIG. 1 thereof, the preferred embodiment of the new and improved hand truck for easy removal of carried objects embodying the principles and concepts of the present invention and generally designated by the reference numeral 10 will be described.

The present invention, the new and improved hand truck for easy removal of carried objects is a system 10 comprised of a plurality of components. In their broadest context, the components include a frame, a pair of curved supports, a plurality of brackets, a pair of wheels, a retainer, a pusher member, a curved lever and a plurality of coil springs. Each of the individual components is specifically configured and correlated one with respect to the other so as to attain the desired objectives.

A central component of the system 10 of the present invention is the frame 12. The frame is in an inverted generally U-shaped configuration. It is formed to have a front face 14 and a rear face 16. It also has a curved upper end 18 for being grasped and handled by a user. It also has free lower ends 20 positionable near the ground over which it is to be moved.

Next provided as part of the system is a pair of curved supports 24. Such supports have upper ends 26 secured to the rear face of the frame. Such securement is adjacent to the upper regions of the frame. The supports also have lower ends 28. Such lower ends are secured to the rear face of the frame. Such securement is adjacent to the lower regions of the frame.

Support is provided to the hand truck through a plurality of brackets 32,34. Such brackets are located on each side of the frame. They function to couple the lower portions of the frame to the central regions of the supports.

A pair of wheels 36 are next provided to the hand truck. Such wheels are rotatably supported about horizontal axes. The wheels are rotatably secured to the supports near the lower regions of the supports.

Operatively coupled with respect to the frame is an L-shaped retainer 40. Such retainer has an elongated generally horizontal portion 42. It also has coupled thereto a short generally vertical portion 44. Securement of the portions of the retainer is to each other and functionally coupled to the front face of the frame. Such functional coupling is adjacent to the lower ends of the frame. The purpose of the retainer is to support boxes 46 for being supported and moved by the hand truck.

Figure 5:
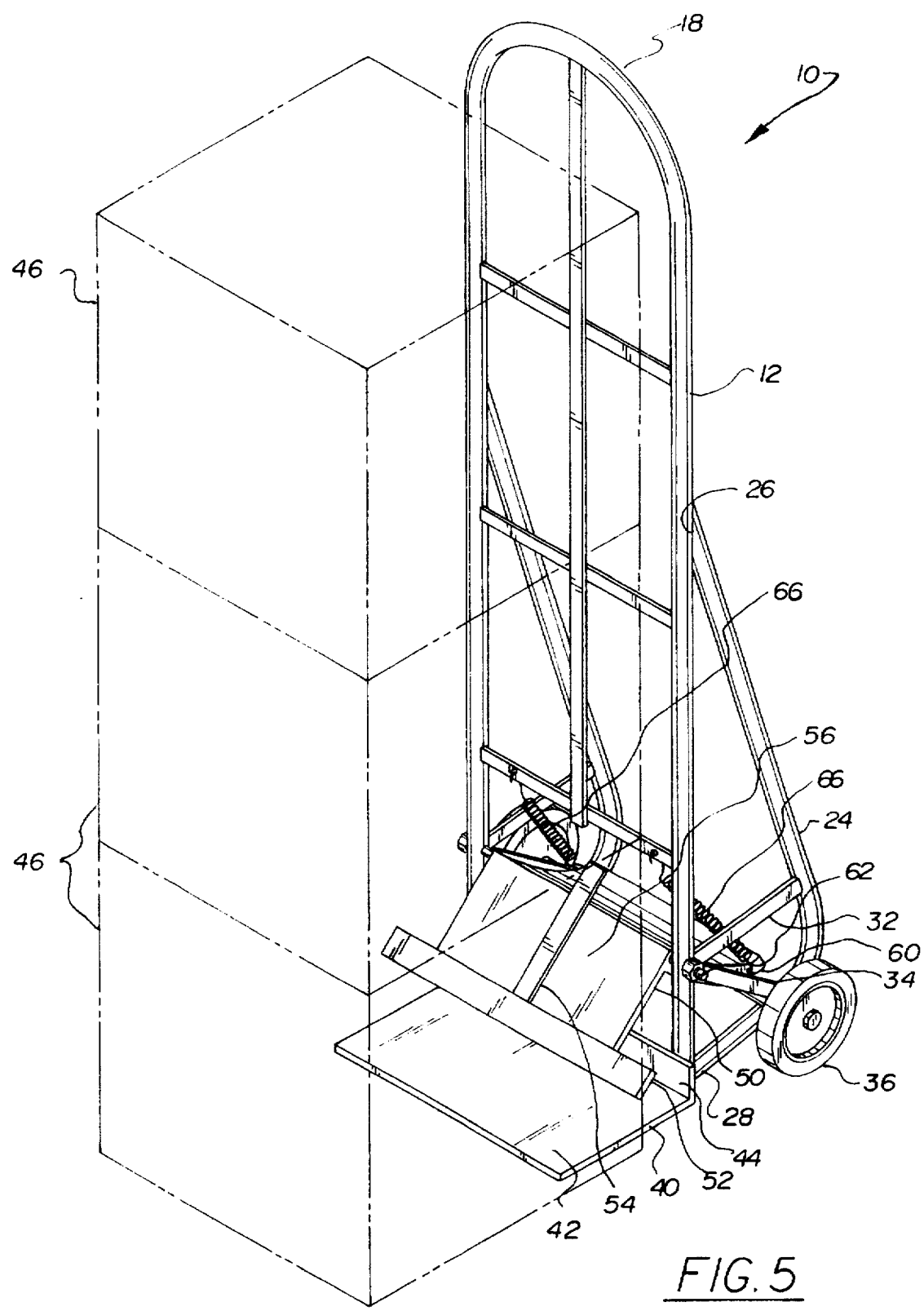
FIG. 5 is a perspective illustration of the hand truck shown in the prior Figures with the pusher mechanism in a forward orientation.

In association with the frame and retainer is a pusher member 50. The pusher member includes a small horizontally extending plate 52 positionable in a first orientation to the vertical plate of the retainer. The pusher also has an associated small vertically extending plate 54. Such vertically extending plate extends upwardly from the small plate. In addition, an enlarged rectangular backing plate 56 is coupled to the horizontal and vertical plates. The function of the pusher is to move from its rest position with its horizontal extending plate adjacent to the vertical plate of the retainer to the pushing orientation as shown in FIG. 5 wherein the pusher member has urged the carried box or boxes from the retainer.

As part of the pusher member there is provided a rearwardly extending curved lever 60. Such lever is secured to and extends rearwardly from the vertically extending plate of the pusher. It extends rearwardly between the supports. A pivot pin 62 couples the lever to the frame adjacent to a lower region of the frame.

Lastly provided as part of the system are a pair of coil springs 66. Each coil spring is formed with a lower end 68. Such lower end is secured to the rearward portion of the lever. Each coil spring also has an upper end 70. The upper ends of the springs are coupled to the frame at spaced locations adjacent to a central extent of the frame.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A new and improved hand truck for easy removal of carried objects comprising, in combination:

a hand truck having an inverted generally U-shaped frame with a front face and a rear face and a curved upper end for handling free lower ends positionable near the ground, a pair of curved supports having upper ends secured to the rear face of the frame adjacent to upper regions thereof and having lower ends secured to the rear face of the frame adjacent to lower regions thereof, a plurality of support brackets on each side of the frame coupling the lower portions of the frame to the central regions of the supports, a pair of wheels rotatably supported about horizontal axes secured to the supports near lower regions thereof;

an L-shaped retainer having an elongated generally horizontal portion and a short generally vertical portion secured to each other and to the front face of the frame adjacent to the lower ends thereof;

a pusher member including a small horizontally extending plate positionable in a first rest orientation adjacent to the vertical plate of the retainer with an associated small vertically extending plate extending upwardly from the small plate with an enlarged rectangular backing plate coupling the horizontal and vertical plates, the pusher member capable of moving from a rest orientation to a pushing orientation for urging a box seated on the horizontal portion of the L-shaped retainer;

a rearwardly extending upwardly curved lever extending rearwardly from the vertically extending plate of the pusher member and between the supports, the rearwardly extending curved lever having a pivot pin coupling the lever to the frame adjacent to a lower region thereof; and a plurality of coil springs with lower ends secured to the rearward portion of the lever and upper ends coupled to the frame adjacent a central extent thereof.

\* \* \* \* \*